(12) United States Patent
Chaponniere

(10) Patent No.: US 8,687,489 B2
(45) Date of Patent: Apr. 1, 2014

(54) ABORTING A PACKETIZED WIRELESS COMMUNICATION

(75) Inventor: Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 12/137,866

(22) Filed: Jun. 12, 2008

(65) Prior Publication Data
US 2008/0310324 A1   Dec. 18, 2008

Related U.S. Application Data

(60) Provisional application No. 60/944,464, filed on Jun. 15, 2007.

(51) Int. Cl.
*H04W 28/00* (2009.01)
*H04W 28/12* (2009.01)

(52) U.S. Cl.
CPC .................................... *H04W 28/12* (2013.01)
USPC .......................................... 370/235; 370/231

(58) Field of Classification Search
CPC ............................ H04W 28/00; H04W 28/065
USPC ................................................. 370/231, 235
See application file for complete search history.

(56) References Cited

U.S. PATENT DOCUMENTS

| | | | |
|---|---|---|---|
| 4,634,165 A | | 1/1987 | Russell et al. |
| 5,129,097 A | * | 7/1992 | Suzuki et al. ................. 455/458 |
| 6,434,165 B1 | * | 8/2002 | Sherer et al. .................. 370/465 |
| 7,295,513 B2 | * | 11/2007 | Elliott et al. .................. 370/229 |
| 2002/0055966 A1 | * | 5/2002 | Border et al. ................. 709/200 |
| 2002/0131425 A1 | * | 9/2002 | Shalom ......................... 370/401 |
| 2003/0051115 A1 | * | 3/2003 | Turner et al. .................. 711/165 |
| 2003/0210662 A1 | * | 11/2003 | Rensberger et al. .......... 370/328 |
| 2003/0210669 A1 | * | 11/2003 | Vayanos et al. ............... 370/335 |
| 2003/0214906 A1 | * | 11/2003 | Hu et al. ....................... 370/231 |

(Continued)

FOREIGN PATENT DOCUMENTS

| | | |
|---|---|---|
| WO | 0020876 | 4/2000 |
| WO | 2004042993 | 5/2004 |

(Continued)

OTHER PUBLICATIONS

International Search Report—PCT/US08/067041—International Search Authority, European Patent Office—Sep. 22, 2008.

(Continued)

*Primary Examiner* — Phirin Sam
*Assistant Examiner* — Tarell Hampton
(74) *Attorney, Agent, or Firm* — Charles Chesney

(57) ABSTRACT

Systems and methods are provided for a signaling an ongoing communication of a data unit in a data packet is to be aborted. Upon a determination to abort an ongoing communication is made, a code-point in a data unit header is utilized to indicate the ongoing communication is to be aborted. A first class of code-point is a dedicated, predefined abort data unit field header. A second class of code-point is a combination of a set of existing, predefined data unit header fields, at least one data unit header field in the combination holds a value that is either invalid or legitimate yet unlikely to occur. Conveying code-point(s) to indicate termination of an ongoing communication of a data unit in a data packet in a regular communication mitigates transmission disruption and saves channel capacity.

35 Claims, 10 Drawing Sheets

(56) References Cited

U.S. PATENT DOCUMENTS

| | | | |
|---|---|---|---|
| 2004/0179547 A1* | 9/2004 | Kuffner et al. | 370/465 |
| 2004/0190509 A1* | 9/2004 | Wishneusky | 370/389 |
| 2005/0014518 A1 | 1/2005 | Spain, Jr. et al. | |
| 2005/0185608 A1* | 8/2005 | Lee et al. | 370/328 |
| 2005/0249213 A1 | 11/2005 | Higuchi et al. | |
| 2006/0063543 A1* | 3/2006 | Matoba et al. | 455/509 |
| 2006/0143444 A1 | 6/2006 | Malkamaki et al. | |
| 2006/0165090 A1* | 7/2006 | Kalliola et al. | 370/395.21 |
| 2006/0222010 A1* | 10/2006 | Bosch et al. | 370/469 |
| 2007/0297435 A1* | 12/2007 | Bucknell et al. | 370/412 |

FOREIGN PATENT DOCUMENTS

| | | |
|---|---|---|
| WO | WO2005122528 A1 | 12/2005 |
| WO | WO2006052085 A1 | 5/2006 |
| WO | WO2006052086 A2 | 5/2006 |

OTHER PUBLICATIONS

Written Opinion—PCT/US08/067041—International Search Authority, European Patent Office—Sep. 22, 2008.
Taiwan Search Report—TW097122290—TIPO—Jul. 10, 2012.

* cited by examiner

ABORTING A PACKETIZED WIRELESS COMMUNICATION

CLAIM OF PRIORITY UNDER 35 U.S.C. §119

This Application for Patent claims the benefit of U.S. Provisional Application Ser. No. 60/944,464 filed on Jun. 15, 2007, and entitled "MAC-EHS OPERATIONS OPTIMIZATION." The entirety of this application is expressly incorporated herein by reference.

BACKGROUND

1. Field

The subject disclosure relates generally to wireless communication and, more particularly, to a mechanism to terminate an ongoing communication of a packet.

2. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the many available wireless communication systems, communication of data packets is often complicated due to the segmentation, which requires a somewhat rigid transmission protocol that lacks pre-emptive termination of a packetized communication without compromising reassembly procedure at a receiver side. In particular, in an aspect of segmented packet(s) communication, for a specific first queue, packets with a higher priority fail to "interspersed" within disparate segmented packet of the same or lower priority; transmission of such packets demand mapping thereof into a second queue with disparate priority. Thus, such a packetized communication can incur undesired delays in the received information and/or increased data-packet error rate. Therefore, there is a need in the art for efficient packetized communications.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

Systems and methods are provided for signaling an ongoing communication of a data unit in a data packet is to be aborted. Upon a determination to abort an ongoing communication is made, a code-point in a data unit header is utilized to indicate the ongoing communication is to be aborted. A first class of code-point is a dedicated, predefined abort data unit field header. A second class of code-point is a combination of a set of existing, predefined data unit header fields, at least one data unit header field in the combination holds a value that is either invalid or legitimate yet unlikely to occur. Conveying code-point(s) to indicate termination of an ongoing communication of a data unit in a data packet in a regular communication mitigates transmission disruption and saves channel capacity.

In an aspect of the subject innovation a method for aborting an ongoing communication is described, the method comprising: determining to abort an ongoing communication of a data unit in a data packet based at least in part on at least one of a received wireless channel state information (CSI), or an agreed quality of service (QoS); and signaling an indication to abort the ongoing communication of the data unit in the data packet by utilizing a code-point in the data unit header.

In another aspect, the innovation discloses an electronic device that operates in a wireless environment, the electronic device comprising: a processor configured to establish an ongoing communication of a data unit in a data packet is to be aborted; to select a combination of a set of predefined data unit header fields to indicate the ongoing communication of the data unit in the data packet is to be aborted; and to convey the combination of the set of predefined data unit header fields; and a memory coupled to the processor.

In yet another aspect, the innovation describes an apparatus comprising: means for evaluating whether to abort a communication of a data unit within a data packet is warranted based at least in part on a set of received wireless channel conditions and a packet segmentation status; means for selecting a code-point in the data unit header as an abort indicator; and means for conveying the abort indicator.

In a further yet aspect, the innovation described herein discloses a computer program product including a computer-readable medium further comprising: code for causing a computer to establish an ongoing communication of a data unit in a data packet is to be aborted; code for causing a computer to generate a dedicated abort data unit header field with a predefined value to indicate the ongoing communication of the data unit in the data packet is to be aborted, wherein the abort packet-header field is an L-bit word, with L a positive integer; and code for causing a computer to convey the abort data unit header field to signal the ongoing communication of the data unit is to be aborted.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
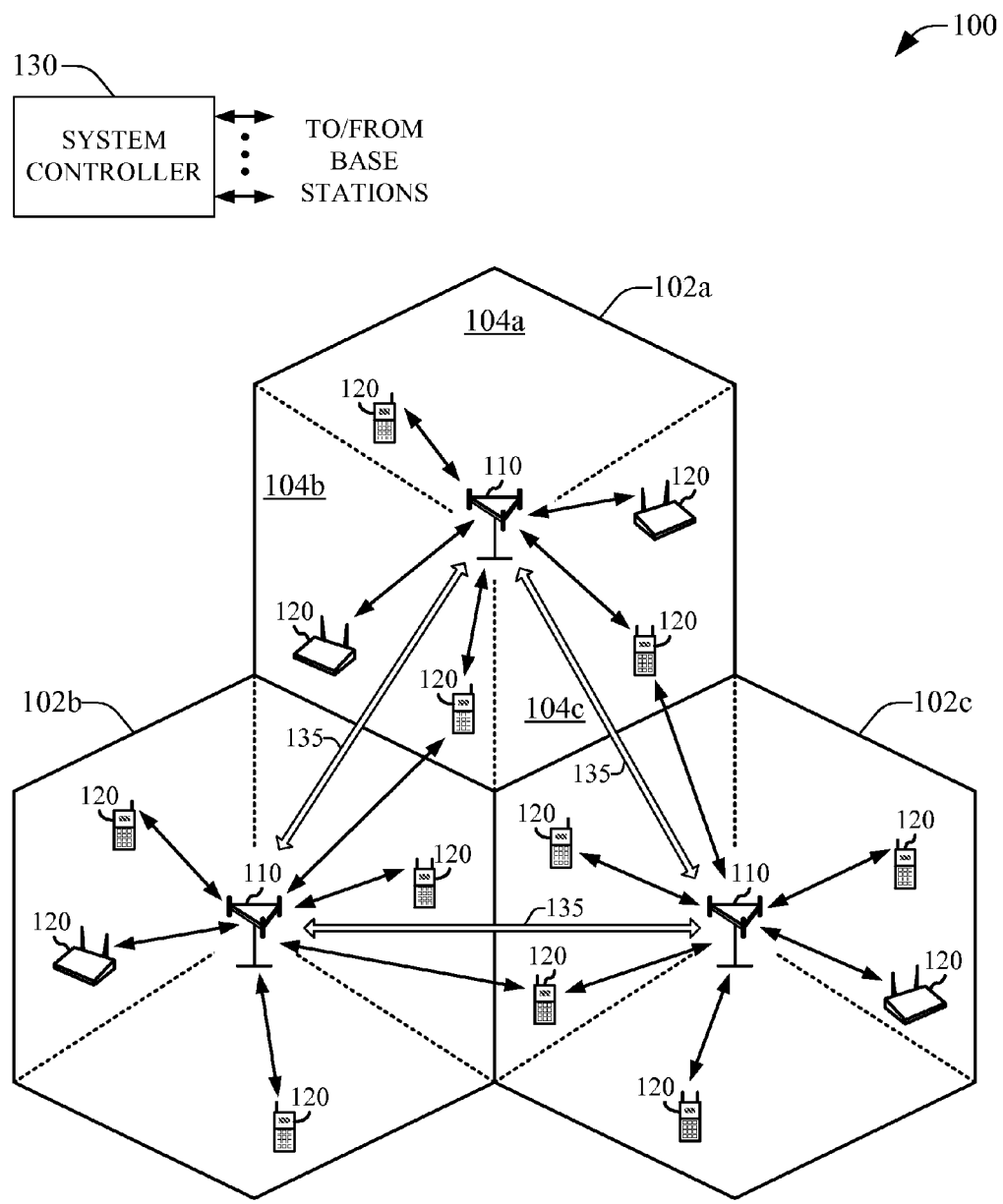
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments disclosed in the subject specification relate to a base station. A base station may refer to a device in an access network that communicates over the air-interface, through one or more sectors, with wireless terminals, and with other base stations through backhaul wired or wireless network communication. The base station may act as a router between the wireless terminal and the rest of the access network, which may include an IP (internet protocol) packet-switched network, by switching received air-interface frames to IP packets. The base station also coordinates management of attributes for the air interface. A base station may also be referred to as an access point (AP), Node B, evolved Node B (eNodeB), evolved base station (eBS), access network (AN) or some other terminology.

In addition, various embodiments are described herein in connection with a wireless terminal. A wireless terminal may refer to a device providing voice and/or data connectivity to a user, or subscriber. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, a customer premises equipment, a user equipment, a wireless device, a cellular telephone, a personal communication system (PCS) telephone, a cordless telephone, a session initiation protocol (SIP) phone, a wireless local loop (WLL) station, a handheld device having wireless connection capability, or other processing device connected to a wireless modem.

Referring now to the drawings, FIG. 1 is an illustration of a wireless multiple-access communication system 100 in accordance with various aspects described herein. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity or component. Each base station 110 provides communication coverage for a particular geographic area 102*a-c*. As used herein and generally in the art, the term "cell" can refer to a base station 110 and/or its coverage area 102*a-c* depending on the context in which the term is used.

To improve system capacity, the coverage area 102*a*, 102*b*, or 102*c* corresponding to a base station 110 can be partitioned into multiple smaller areas (e.g., areas 104*a*, 104*b*, and 104*c*). Each of the smaller areas 104*a*, 104*b*, and 104*c* can be served by a respective base transceiver subsystem (BTS, not shown). As used herein and generally in the art, the terms "sector" or "cell" can refer to a BTS and/or its coverage area depending on the context in which the term is used. In one example, sectors 104*a*, 104*b*, 104*c* in a cell 102*a*, 102*b*, 102*c* can be generated by groups of antennas (not shown) at base station 110, where each group of antennas is responsible for communication with terminals 120 in a portion of the cell 102*a*, 102*b*, or 102*c*. For example, a base station 110 serving cell 102*a* can have a first antenna group corresponding to sector 104*a*, a second antenna group corresponding to sector 104*b*, and a third antenna group corresponding to sector 104*c*. In addition, sectors can be generated through beamforming effected through said antenna groups. Moreover, antenna groups can facilitate multiple-input multiple-output (MIMO) communication among one or more terminals 120 and a base station. It should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell.

In accordance with one aspect of the subject innovation, terminals 120 can be dispersed throughout the system 100, wherein each terminal 120 can be stationary or mobile. A terminal 120 can be any of the devices mentioned above, and can communicate with any number of base stations 110 or no base stations 110 at any given instant.

In another aspect, system 100 can utilize a centralized architecture by employing a system controller 130 (e.g., a radio network controller (RNC)) that can be coupled to one or more base stations 110 and provide coordination and control thereof. It should be appreciated that system controller 130 can be a single network entity or a collection of network entities. Additionally, system 100 can utilize a distributed architecture to allow base stations 110 to communicate with each other as needed (e.g., in a terminal handover). In an aspect of the subject innovation, backhaul wired or wireless network communication 135 can facilitate point-to-point communication between base stations employing such a distributed architecture. In one example, system controller 130 can additionally contain one or more connections typically effected through gateway(s) to multiple networks. These networks can include the Internet, other packet based networks (e.g., packet switched core network (PSCN)) which support voice and data service(s), and/or circuit switched voice and data networks (e.g., circuit switched core network) that can provide information to and/or from terminals 120 in communication with one or more base stations 110 in system 100. In another example, system controller 130 can include, or be coupled with, a scheduler (not shown) that manages radio resources and schedules transmissions to and/or from terminals 120. In addition, or alternatively, a scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes, Gold codes, Kasami codes, pseudonoise codes) even though they are sent in the same time interval or frequency subcarrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g. tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA.

In another example, base stations 110 and terminals 120 in system 100 can communicate data using one or more data channels and signaling using one or more control channels. Data channels utilized by system 100 can be assigned to active terminals 120 such that each data channel is employed by a single terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2:
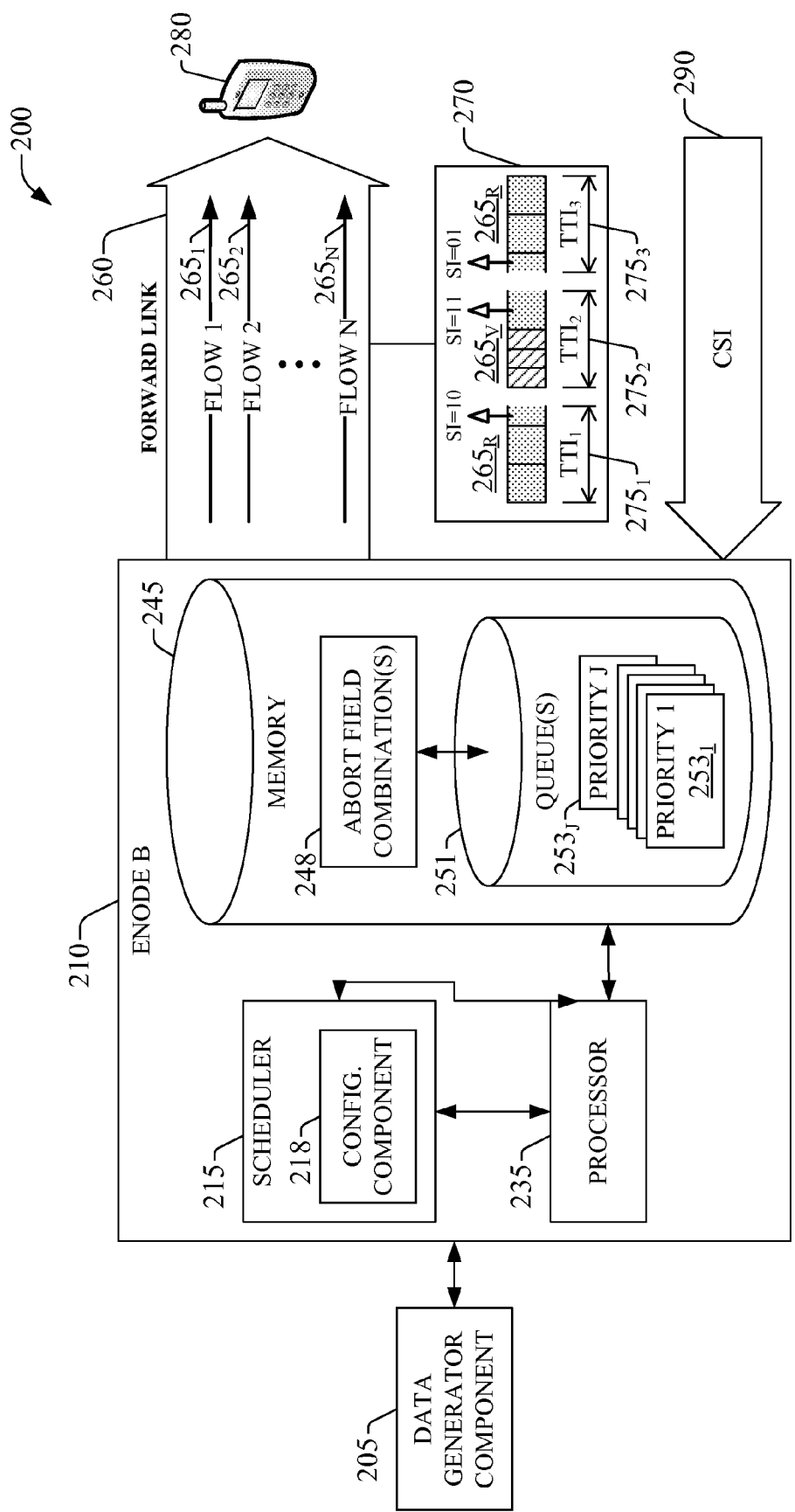
FIG. 2 is a block diagram of a system 200 that establishes and utilizes indicator(s) to terminate, or abort, ongoing packet transmission(s) within data-packet flows in accordance with aspects of the subject innovation.

FIG. 2 is a block diagram of a system 200 that establishes and utilizes indicator(s) to terminate, or abort, ongoing packet transmission(s) within data-packet flows. A flow is typically established by a packet-based (e.g., internet protocol (IP)-packet based) network management component (e.g., network system controller 130). In evolved UTRAN (universal terrestrial radio access network), an evolved packet system (EPS) can create data-packet flows through a data generator component 205, the data-packet flows can arrive via a wired or wireless network, or backhaul communication backbone, to a base station, or evolved Node B (eNode B) 210. Data generator component 205 can create multiple flows (e.g., flows $265_1$-$265_N$) which can be associated with disparate instances of applications—e.g., voice, video- and audio-streaming, file transfer(s), web browsing, online gaming—that generate data to be provided wirelessly, e.g., via a forward link 260, to a terminal 280 through eNode B 210. It should be appreciated that terminal 280 can convey data, packetized or otherwise, to eNode B 210 via a wireless uplink.

Data packets received by eNode B 210 for communication to a terminal 280 can be queued in memory 245 in queue(s) 251, each queue can be assigned a priority 253 by configuration component 218 within scheduler 215, wherein the priority can be assigned in accordance with various network-configured quality of service (QoS) parameters such as traffic class and traffic handling priority, guaranteed bitrate (GBR), maximum bitrate (MaxBR), minimum bitrate (MinBR), average bitrate (AvBR), maximum packet loss rate, delay budget (e.g., fraction of data queued in eNode 210 per packet), flow maximum tolerated latency, and so on. A label can be assigned to a flow, and thus to packets associated therewith, to identify its priority queue (e.g., guaranteed bit rate (GBR) queue or non-GBR queue). A label is typically conveyed in a (MAC-ehs) packet header. It should be appreciated that such label information may be common to substantially all data flows $265_1$-$265_N$ (N is a positive integer), including those that are periodic or aperiodic burst-like flows, such as VoIP (voice over IP), in which instance substantially all flows (e.g., $265_1$-$265_N$) can belong to substantially the same priority queue. In an aspect of the subject innovation, data packets can be packet data units (PDUs) handled within medium access control (MAC) sub-layer in data layer; packets can be MAC-d PDUs or MAC-c PDUs.

To communicate a data-packet flow, eNodeB 210 includes a scheduler 215 that allocates communication resources for a set of N data flows ($255_1$-$255_N$) created by data generator component 205, wherein resources are granted according to queue(s) 251 priority (e.g., priority $253_J$) and queue(s) 251 sizes (e.g., volume of information to be conveyed over to terminal 260), label information associated with each flow, in addition to channel state information (CSI) 290 which includes channel quality conditions (e.g., channel signal strength), cell/sector load, available bandwidth and power density, antenna configuration at base station (e.g., eNode B 210) and terminal (e.g., mobile 280), and the like. Typically, scheduler 215 utilizes algorithms such as round robin, fair queuing, maximum throughput, proportional fairness, etc., to determine packet format(s)—e.g., code rate and constellation size-allocated subcarriers, power/power density, and so forth. In addition, as size of data packets can typically depend on the application that generates them (e.g., in VoIP quasi-periodic flow, payload can be nearly 50 bytes or less), scheduler 215 can segment, or fragment, packets in a queue to accommodate a payload within a transmission time interval (TTI), e.g., TTI $275_1$, in accordance with at least channel state information 290 and QoS parameters, such as subscriber agreed quality of service. It should be appreciated that conventionally, segmentation of a data packet, which can be effected via configuration component 218, can typically increase latency and resulting error rate-when a data packet in a queue is segmented, transmission of the data packet from the queue must be completed before transmission of a new packet can be performed. In alternative terms, conventional systems for fragmented packet transmission typically lack pre-emption of data packets in a queue. However, channel state can be such that communication of a substantial non-segmented portion of a packet can result in packet loss. Thus, communication of segmented data packets ensues a trade-off between associated service degradation and effective utilization of radio resources for a channel state To facilitate the foregoing trade-off, in an aspect of the subject innovation, scheduler 215 can abort communication of larger packets in favor of smaller data packets within a queue. It is to be noted that even though packets are mapped onto queue(s) 251 in accordance to priority (e.g., priority $253_1$), flows within a queue can have disparate effective priorities; for instance, a flow generated for latency-critical application such a banking transaction, or video-conference can have a higher effective priority for a subscriber with a hard QoS service agreement than for a subscriber with soft QoS. In an aspect of the subject innovation, termination of transmission of a packet, or data unit within a packet, in an ongoing communication can rely upon introduction of an abort code-point in the packet header of a packet, or data unit within a packet, to be aborted. In an aspect of the subject innovation, a code-point is a dedicated L-bit word "abort field" (L is a positive integer). In another aspect, an abort code-point is a packet, or data unit, header field combination(s) 248. Configuration component 218 facilitates scheduler 215 to enter an "abort field" in the header of a packet, or data unit within a packet, to be aborted or to select a preconfigured abort packet, or data unit, header field combination 248 from memory 245. It is to be noted that abort header field combination(s) 248 arise from packet, or data unit within a packet, header fields employed for standard communication of a packet, or data unit within a packet; for example, combinations can be based on 'SID', 'N', and 'F' fields in MAC-ehs within high-speed downlink packet access (HSPDA) standard. It should also be noted that combinations can be generated dynamically through configuration component 218, such combinations can be stored, or reserved for use, in memory 245 within abort field combination(s) 248. Fields in abort header field combination(s) 248 adopt values that are invalid within a standard or have a low probability of occurrence. When a packet or data unit header is conveyed, or transmitted to a receiver (e.g., 280), the incorporation of either "abort header" or an abort header field combination signals the receiver that the packet is to be regarded as lost and reassembly attempts not be pursued.

An advantage of termination of an ongoing communication of a packet, or a data unit within a packet, in accordance with aspects described hereinbefore, is that through incorporation of abort code-point(s) into the packet, or data unit, header (e.g., MAC-ehs PDU header) in a regular transmission saves channel capacity and avoids disruption of data flow, which can arise from a delay associated with communication completion of a packet to be aborted. Panel 270 illustrates such advantage for data flows $265_R$ and $265_V$, wherein five packets for flow $265_R$ are conveyed, one of the packets segmented in $TTI_1$ (packet is head-segmented; segmentation indication SI=10), in $TTI_2$ (tail- and head-segmented, SI=11) and in $TTI_3$ (tail-segmented; SI=01), and three smaller packets are conveyed for flow $265_V$. As illustrated, the segmented packet in flow $265_R$ is aborted and pre-empted by the smaller packets for flow $265_V$. When aborted packet is received, e.g., in UE 280, reassembly is disregarded in view of communication termination of the packet.

It is to be noted that, as discussed supra, a determination to abort an ongoing transmission of a data packet is based at least in part on a trade-off among effective utilization of resources, which are scheduled primarily based on channel state information, and packet priority within a queue of a definite priority. Such trade-off can be established through utility analysis, e.g., a cost-benefit of termination of packet of a specific format, generated by a specific application for a specific subscriber; or historic data associated with data-packet communication under specific channel conditions (e.g., loss rate for packets of a specific format associated with a specific application and conveyed under specific channel conditions, or attained bit rate (e.g., as measured via received ACK/NACK) under termination of packets of a specific format under specific power allocation, and so forth); or patterns of space-, time-, and/or subscriber-dependent communication with packet-abort features. Accordingly, it should be appreciated that an abort determination can be based at least in part on an agreed QoS, which can affect the aforementioned tradeoff, and segmentation status as well in view that packet segmentation affects, or impacts, utilization of radio resources. In an aspect of the subject innovation, trade-off analysis that can lead to a determination to abort communication of a packet can rely on artificial intelligence techniques, which apply advanced mathematical algorithms—e.g. decision trees, neural networks, regression analysis, principal component analysis (PCA) for feature and pattern extraction, cluster analysis, genetic algorithm(s), reinforced learning . . . —to a set of available cumulative statistics 246.

In particular, the intelligent component 158 can employ one of numerous methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The foregoing methods can be applied to analysis of allocated, or granted, communication resources, to extract suitable transport formats.

It should be appreciated that in example system 200, processor 235 is configured to carry out all operations that confer scheduler 215 and configuration component 218 their functionality as described above. In addition it is to be noted that processor 235 can also perform disparate functionalities that support operation of scheduler 215 and configuration component 218, such as collection of data-packets from a data source, e.g., data generator 205, and storage and extraction of said data in memory 245. It is to be noted that while processor 235 and scheduler 215, which comprises configuration component 218, are illustrated as separated components functionally coupled (see arrows), such components can be consolidated into a single functional component that configures data, schedules packet flows, determines whether to abort a packet and signals such determination, wherein the functional component carries all necessary operations and computation through processor 235. In addition to queue(s) 251 and reserved abort field combination(s) 248, memory 225 can store code instructions, objects and modules, data structures, as well as code instructions to be carried out by processor 235 in connection with termination of ongoing data packet(s) communication associated with optimization of flow scheduling. Moreover, code instructions necessary for processor 235 to carry out other functionalities of eNode B 210 such as collection of data from data generator 205, and transmission of data-packet flows $255_1$-$255_N$ over a forward link 250 can also be stored in memory 245.

Illustrative abort code-points are discussed in greater detail below in connection with dedicated abort header field(s) and abort header field combinations.

Figure 3:
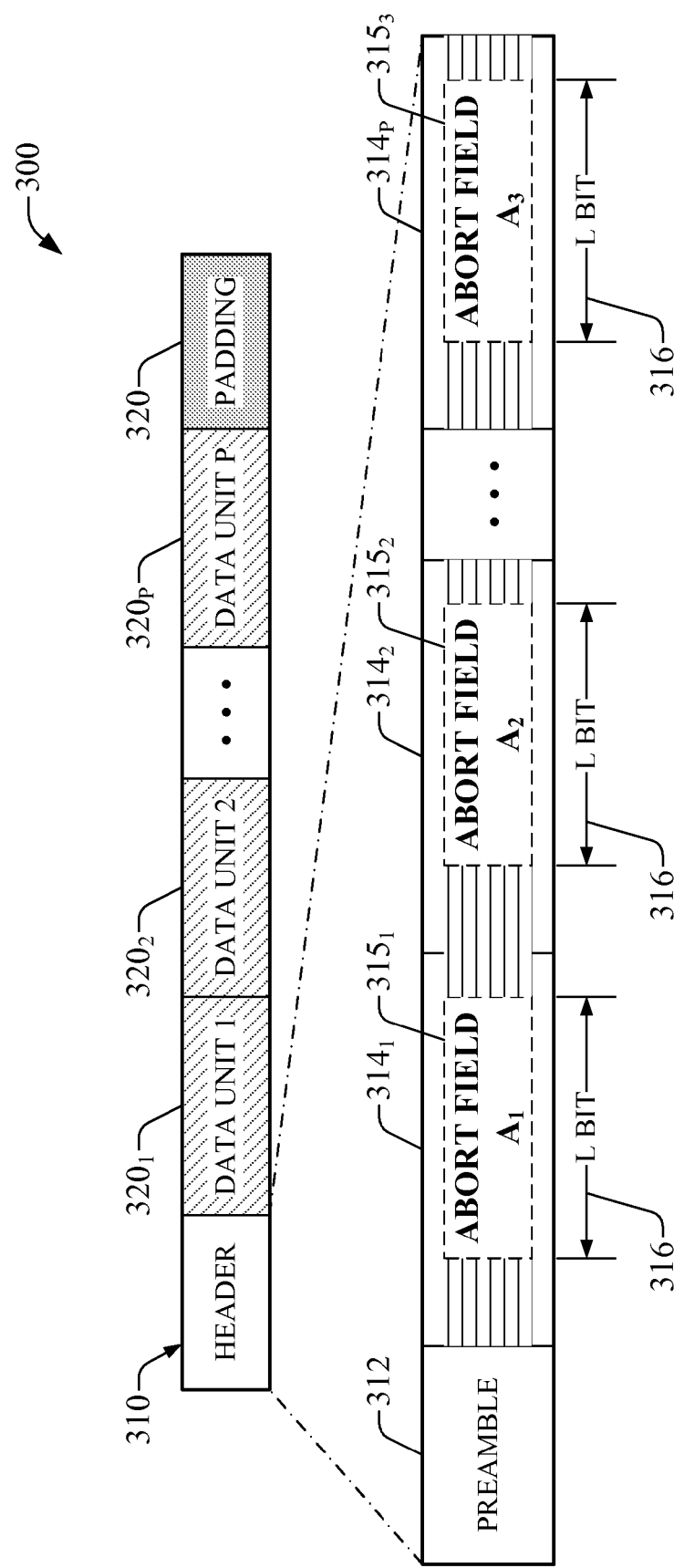
FIG. 3 is a diagram of a transmitted header that includes indication(s) of data packets to be aborted in accordance with aspects disclosed herein.

FIG. 3 is a diagram 300 of a communicated data packet (e.g., a MAC-ehs packet) that comprises data units to be aborted. Packet in diagram 300 includes a header 310, a set of P (a positive integer) data units (e.g., MAC-d SDUs) $320_1$-$320_P$ that are conveyed in accordance with header 310, and a padding block 320 which ensures conveyed packet is compatible with transport format. In MIMO communication, as many packets as the rank of the MIMO channel can be conveyed in a single TTI (e.g., 2 ms); the SISO (single-input single-output case) affords a single header 310 per TTI. Header 310 comprises a preamble 310, which can include a field that indicates queue priority, or traffic handling priority, for reordering at the receiver. In addition, header 310 includes a set of P header field holders $314_1$-$314_P$, which are data unit headers for the respective data units (DUs) $320_1$-$320_P$, each data unit header includes various data unit header fields that characterize each data unit in the set {DU $320_1$, DU $320_2$, ..., DU $320_P$}. For example, such header fields can include a length field '$N_I$' (I=1, ... P) that indicates the length of DU $320_I$, a flag '$F_I$' header field which can indicate termination (F=1) or continuation (F=0) of a sequence (e.g., $320_1$-$320_P$) of DUs, and other standard header fields such as for example a size index identifier (SID), which indicates the size of a set of consecutive blocks or packets (e.g., MAC PDUs) within a data unit (e.g., DU $320_2$). In an aspect of the subject innovation, a header field holder (e.g., $314_2$), or data unit header, can include an abort code-point, e.g., $A_2$, in a data unit header field (e.g., $315_2$) which can be an L-bit word 316 (L a positive integer), the L-word assumes a predefined value (e.g., 11, for L=2) which indicates, or signals, that communication of data unit, e.g., DU $320_2$, is to be aborted. In diagram 300, three data units (e.g., MAC-d SDUs, or MAC-d PDUs) are to be aborted; however, it should be appreciated that up to P abort fields $A_P$ can be present in data packet 300, which could indicate that all DUs within a TTI are to be aborted. Scheduler 215 determines the number of aborted data units (e.g., MAC-d PDUs), and thus it determines the number of abort data unit header fields in a packet 300. As an illustration, in panel 270, for $TTI_2$, P=3 with $A_3$ present in a third field holder to indicated that third data unit, or packet, is to be aborted, as discussed in connection with FIG. 2.

Figure 4A:
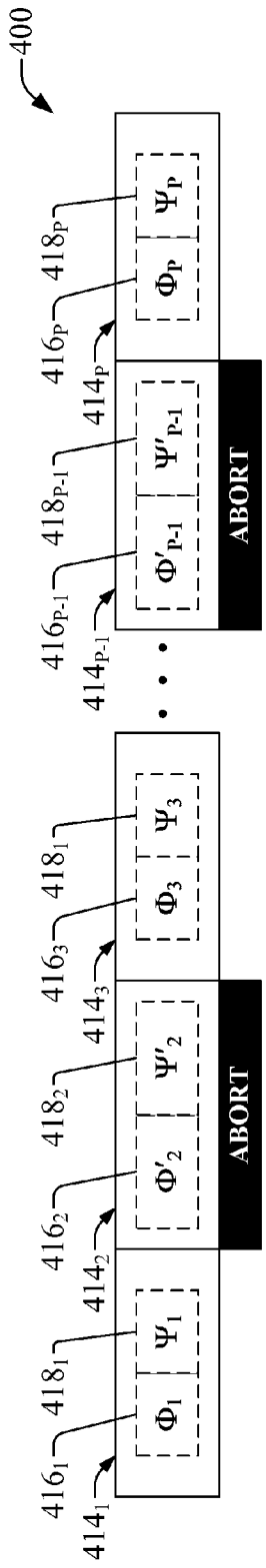
FIG. 4 is a diagram of a transmitted header that includes indication(s) of data packets to be aborted in accordance with aspects disclosed herein.
Figure 4B:
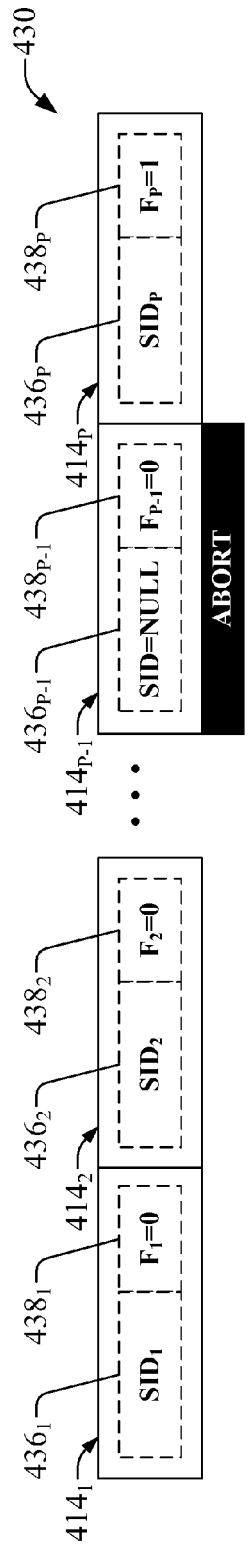
Figure 4C:
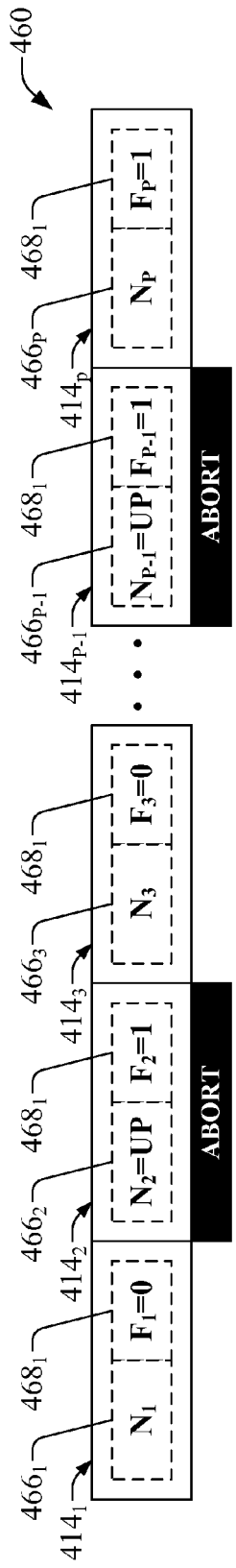

FIGS. 4A-4C are diagrams of conveyed header field holders $414_1$-$414_P$, or data unit headers, that indicate through a combination of a set of two standard data unit header fields that an ongoing data unit in a data packet 300 communication is to be aborted. It should be appreciated that the set of standard data unit header fields utilized to indicate a data unit in a data packet 300 communication is to be aborted can include more than two data unit header fields. FIG. 4A illustrates diagram 400 wherein a set of two data unit header fields {Φ,Ψ} is utilized to signal communication termination. For instance, Φ or Ψ can be data unit header field 'N', data unit header field 'SID', or flag 'F.' To signal, or indicate, a data unit (e.g, DU $320_2$) within a data packet is to be aborted, fields Φ 416 Ψ and 418 adopt predetermined values, e.g., $Φ'_2$ $416_2$ and $Ψ'_2$ $418_2$, that are invalid or non-standard values, or the values have a negligible likelihood to occur (e.g., to be actually scheduled, or defined through higher layers) in a communication. In diagram 400, DU $320_4$ is also aborted in view of fields Φ 416 and Ψ 418 adopt predetermined values $Φ'_2$ $416_2$ and $Ψ'_2$ $418_2$. FIG. 4B presents a scenario 430 where Φ=SID $436_λ$ and Ψ=F $438_λ$ (with λ=1, ..., P-1, P), wherein a combination of SID=NULL $436_{P-1}$ (e.g., SID='000', when SID is a 3-bit field as in 3GPP Release 7.4 of MAC specification) and F=0 $438_{P-1}$. Such combination conveys and indication to abort since SID=NULL is highly unlikely to be established during communication. FIG. 4C illustrates scenario 460, wherein a data unit communication abort is indicated through a combination of improper, or invalid, values of two fields: Φ=N $466_λ$ and Ψ=F $468_λ$ (with λ=1, ..., P-1, P). When N adopts a value above (e.g., N='UP') the standard largest value specified in the telecommunication standard and F improperly flags a subsequent header field holder, or data unit header, then the data unit (e.g., DU $320_2$) associated with the improperly defined combination of two data unit header fields construes the indication to abort the data unit (e.g., DU $320_2$).

In view of the example systems presented and described above, methodologies for terminating an ongoing communication of a packet that may be implemented in accordance with the disclosed subject matter will be better appreciated with reference to the flowcharts of FIGS. 5, 6, and 7A and 7B. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. Furthermore, combination of disclosed methodologies can results in derived methodologies with additional, or alternative advantages. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. It should be understood and appreciated that a methodology could alternatively be represented as a series of interrelated states or events, such as in a state diagram.

Figure 5:
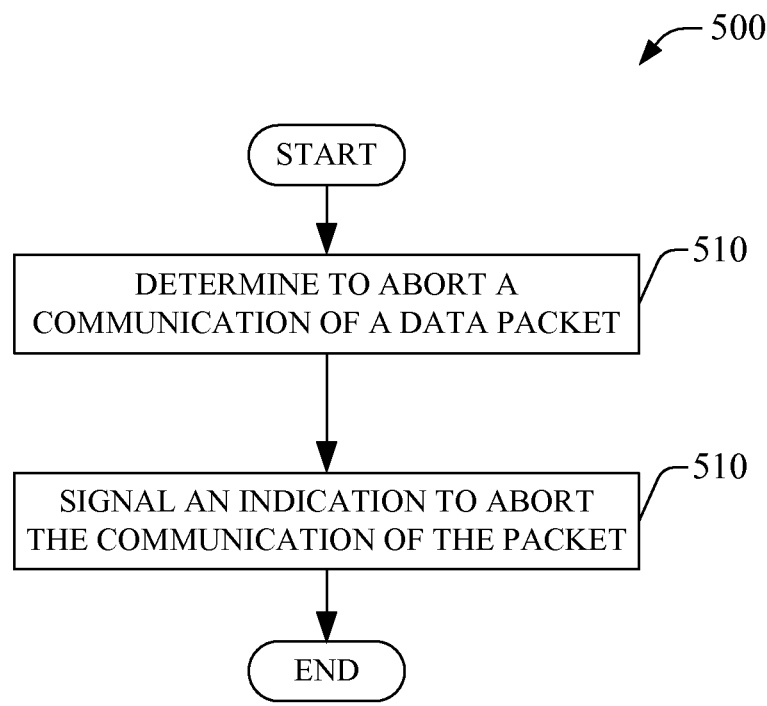
FIG. 5 presents a flowchart of an example method for signaling termination of an ongoing packet communication according to aspects described herein.

FIG. 5 presents a flowchart of an example method 500 for signaling termination of an ongoing packet communication according to aspects described herein. Example method can be exploited in a transmitter that communicates packetized flows, the transmitter can be base station, or it can be a mobile conveying data to either a base station or to a disparate mobile in a peer-to-peer communication. At act 510, it is determined to abort a communication of a data packet. At act 520, an indication to abort a transmission of a packet is signaled.

Figure 6:
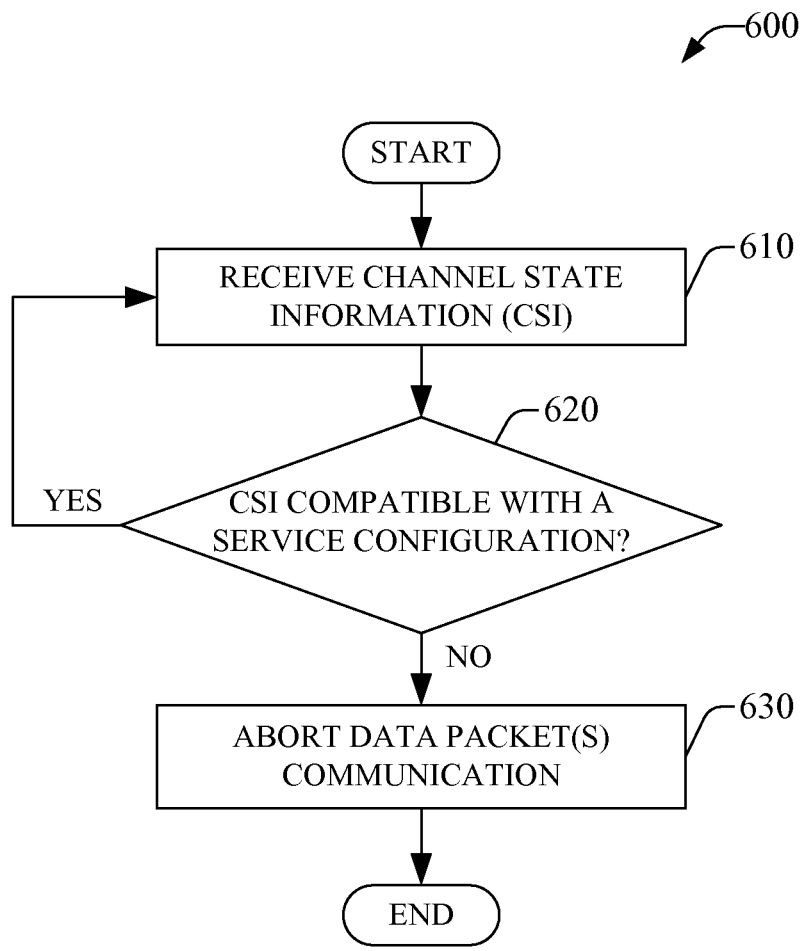
FIG. 6 presents a flowchart of an example method for determining whether to abort an ongoing communication of a packet according to aspects described in the subject specification.

FIG. 6 presents a flowchart of an example method 600 for determining whether to abort an ongoing communication of a packet (e.g., a MAC-ehs packet) according to aspects described in the subject specification. Example method 600 can complement, or supplement, example method 500. At act 610 channel state information is received. In an aspect of the subject innovation, CSI can include channel signal strength, intra-cell/sector and inter-cell/sector interference, receiver antenna configuration, allocated power spectral density for data-packet flows or logical channels, cell/sector throughput and estimated capacity, cell/sector load, and so forth. At act 620, it is evaluated whether received CSI is compatible with service configuration, wherein service configuration is dictated by network-configured, or agreed, QoS parameters for served subscriber(s), subscriber station(s), location of served user equipment (e.g., cell edge), and the like. The evaluation can be based at least in part on utility analysis, reported channel measurements performed by a receiver, cell load, cell/sector throughput, etc, or historic data. In case evaluation act 620 indicates CSI and configured service are incompatible, which it can reflect a more efficient utilization of radio resource, or better QoS, is possible, communication of data packet(s), or data units within data packet(s), is aborted. Conversely, compatibility among CSI and service configuration returns flow to act 610.

Figure 7A:
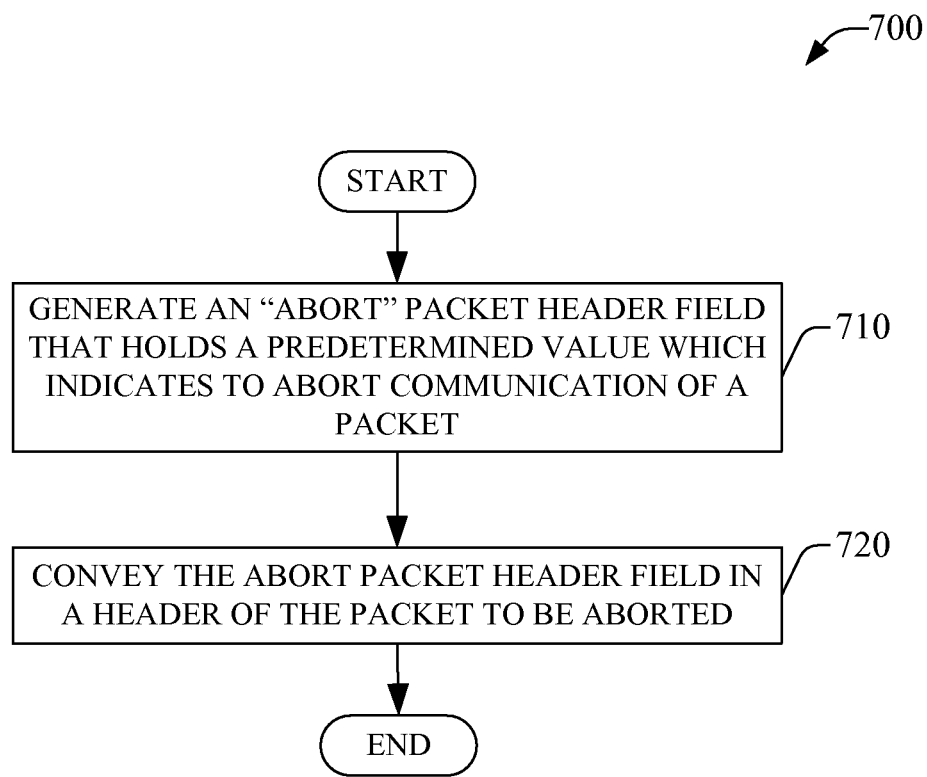
FIGS. 7A and 7B present flowcharts example methods for signaling termination of an ongoing data-packet communication according to aspects described in the subject specification.

FIG. 7A presents a flowchart of an example method 700 for signaling a termination of an ongoing data-packet communication according to aspects described in the subject specification. Example method 700 can complement, or supplement, example method 500. At act 710, a packet header field is generated, the packet header field holds a predetermined value which indicates to abort an ongoing communication of a packet. In an aspect of the subject methodology, the packet header field can be an L-bit word (L is an integer) with L O(1 bit) to ensure low signaling overhead. At act 720, the abort packet header field is conveyed in a header of the packet to be aborted. In another aspect, the packets that are aborted are MAC-d PDUs.

Figure 7B:
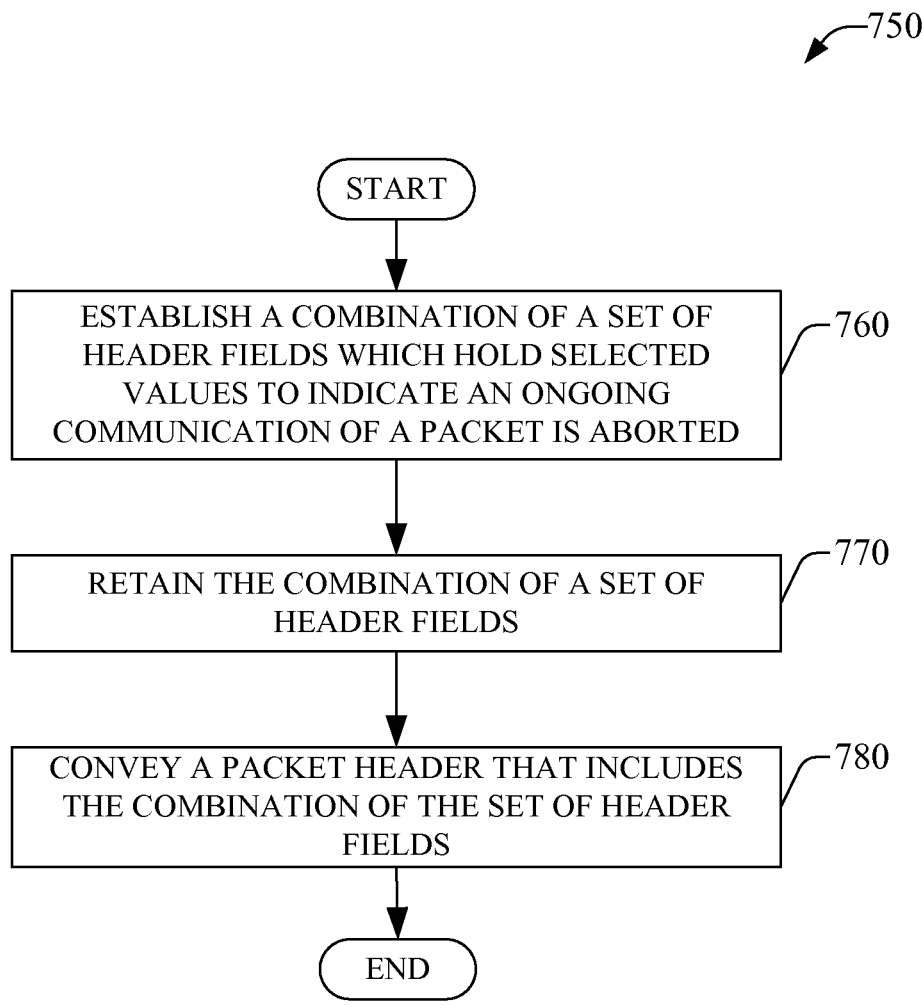

FIG. 7B presents a flowchart of an example method 750 for signaling a termination of an ongoing data-packet communication according to aspects described in the subject specification. At act 760, a combination of a set of header fields is established, the header fields in the combination hold selected values that in conjunction indicate an ongoing communication of a packet is to be aborted. In an aspect of the methodology the header fields belong to a standard set of header fields utilized in communication of MAC-ehs PDUs. At act 770, the combination of the set of header fields is retained. Typically the combination are stored in a memory and reserved for signaling a packet communication is to be aborted. At act 780, a packet header that includes the combination of the set of header fields is conveyed. In another aspect of the subject methodology, the combination of header fields can be compressed to reduced overhead, and jointly multiplexed to mitigate the likelihood of the combination to be lost during transmission.

Figure 8:
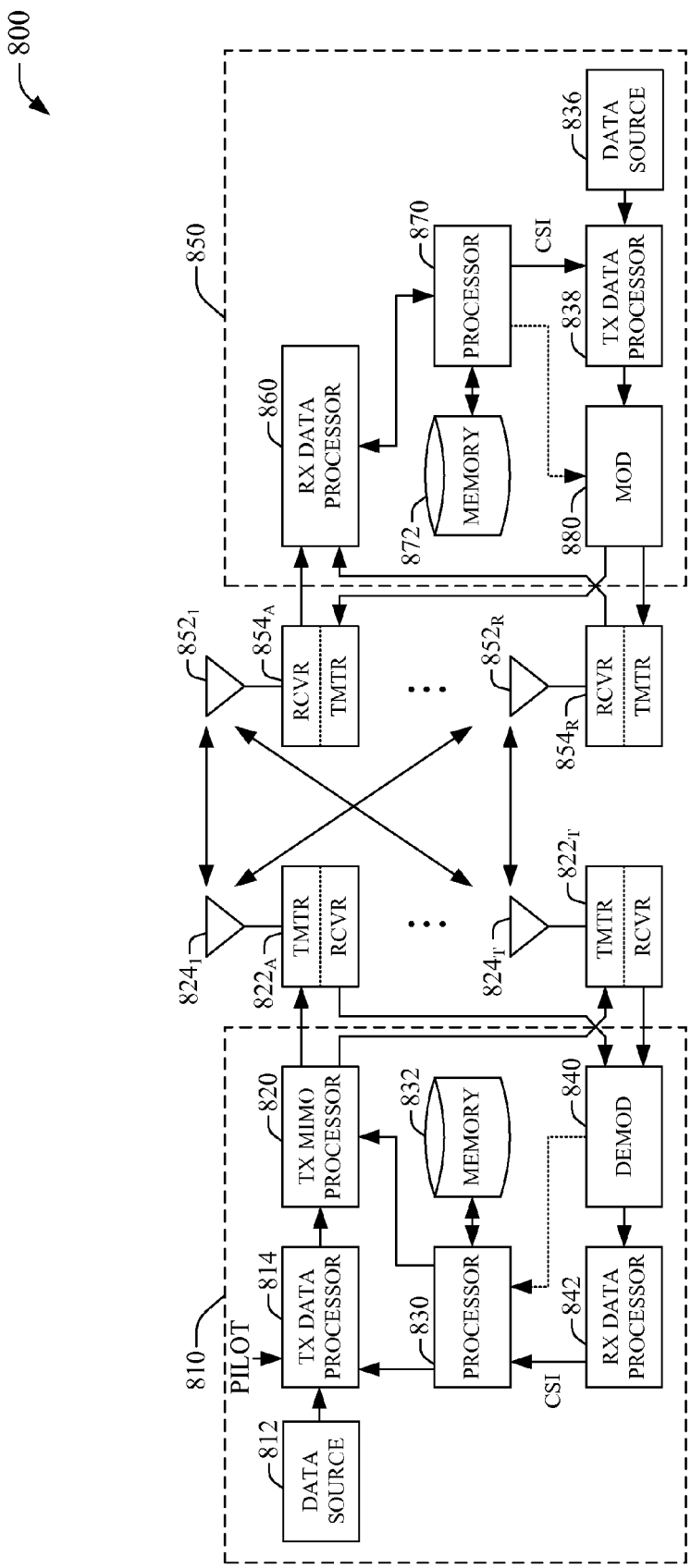
FIG. 8 is a block diagram of an embodiment of a transmitter system and a receiver system with MIMO operation capabilities that provide for cell/sector communication in accordance with aspects described in the subject description.

FIG. 8 is a block diagram 800 of an embodiment of a transmitter system 810 (such as eNode B 210, or base stations 110a, 110b, or 110c) and a receiver system 850 (e.g. access terminal 260) in a MIMO system that can provide for cell/sector communication in a wireless communication environment in accordance with one or more aspects set forth herein. At the transmitter system 810, traffic data for a number of data streams can be provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 830, the instructions as well as the data may be stored in memory 832. Processor 830 also executes instructions, stored on memory 832, that facilitate to schedule data packets for one or more packetized data streams, to determine an ongoing communication of a data packet is to be aborted, to identify a code-point that signals an ongoing communication is to be aborted, and so on.

The modulation symbols for all data streams are then provided to a TX MIMO processor 820, which may further process the modulation symbols (e.g. OFDM). TX MIMO processor 820 then provides $N_T$ modulation symbol streams to $N_T$ transceiver (TMTR/RCVR) $822_A$ through $822_T$. In certain embodiments, TX MIMO processor 820 applies beamforming weights (or preceding) to the symbols of the data streams and to the antenna from which the symbol is being transmitted. Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $822_A$ through $822_T$ are then transmitted from $N_T$ antennas $824_1$ through $824_T$, respectively. At receiver system 850, the transmitted modulated signals are received by $N_R$ antennas $852_1$ through $852_R$ and the received signal from each antenna 852 is provided to a respective transceiver (RCVR/TMTR) $854_A$ through $854_R$. Each transceiver $854_1$-$854_R$ conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ transceivers $854_1$-$854_R$ based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810. A processor 870 periodically determines which pre-coding matrix to use, such a matrix can be stored in memory 872. Processor 870 formulates an uplink message comprising a matrix index portion and a rank value portion. Memory 872 may store instructions that when executed by processor 870 result in formulating the reverse link message. The uplink message may comprise various types of information regarding the communication link, or channel, or the received data stream, or a combination thereof. As an example, such information can comprise a channel quality indicator, receiver antenna configuration, power allocation, system information, and so forth. The uplink message is then processed by a TX data processor 838, which also receives traffic data for a number of data streams from a data source 836, modulated by a modulator 880, conditioned by transceiver $854_A$ through $854_R$, and transmitted back to transmitter system 810.

At transmitter system 810, the modulated signals from receiver system 850 are received by antennas $824_1$-$824_T$, conditioned by transceivers $822_A$-$822_T$, demodulated by a demodulator 840, and processed by a RX data processor 842 to extract the reserve link message transmitted by the receiver system 850. Processor 830 then determines which pre-coding matrix to use for determining the beamforming weights and processes the extracted message.

Single-user (SU) MIMO mode of operation corresponds to the case in which a single receiver system 850 communicates with transmitter system 810, as illustrated in FIG. 8 and according to the operation described above. It should be appreciated that in the subject mode of operation inter-cell power can be effected as described hereinbefore. In a SU-MIMO system, the $N_T$ transmitters $824_1$-$824_T$ (also known as TX antennas) and $N_R$ receivers $852_1$-$852_R$ (also known as RX antennas) form a matrix channel (e.g., Rayleigh channel, or Gaussian channel) for wireless communication. The SU-MIMO channel is generally described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to min $\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension or communication layer.

In one aspect, transmitted/received symbols with OFDM, at tone ω, can be modeled by:

$$y(\omega) = \underline{H}(\omega) c(\omega) + n(\omega). \qquad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ preceding output vector. $N_V$ is the actual number of data streams (layers) transmitted by transmitter 810, and $N_V$ can be scheduled at the discretion of the transmitter (e.g., eNode B 210) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 810 allocates to transmit each data stream $N_V$. It should be appreciated that such a power gain matrix can be a resource that is assigned to access terminal 240, and it can be managed through adjustment of power offsets as described herein. In view of the FL/RL reciprocity of the wireless channel, it should be appreciated that a transmission from MIMO receiver 850 can also be modeled in the fashion of Eq. (1), including substantially the same elements. In addition, receiver 850 can also apply pre-coding schemes prior to transmitting data in the reverse link.

In system 800 (FIG. 8), when $N_T=N_R=1$, system 800 reduces to a single-input single-output (SISO) system that can provide for sector communication in a wireless communication environment in accordance with one or more aspects set forth herein. Alternatively, a single-input multiple output (SIMO) mode of operation corresponds to $N_T>1$ and $N_R=1$. Furthermore, when multiple receivers communicate with transmitter system 810, a multiuser (MU) MIMO mode of operation is established.

Next, a system that can enable aspects of the disclosed subject matter are described in connection with FIG. 9. Such system can include functional blocks, which can be functional blocks that represent functions implemented by a processor or an electronic machine, software, or combination thereof (e.g., firmware).

Figure 9:
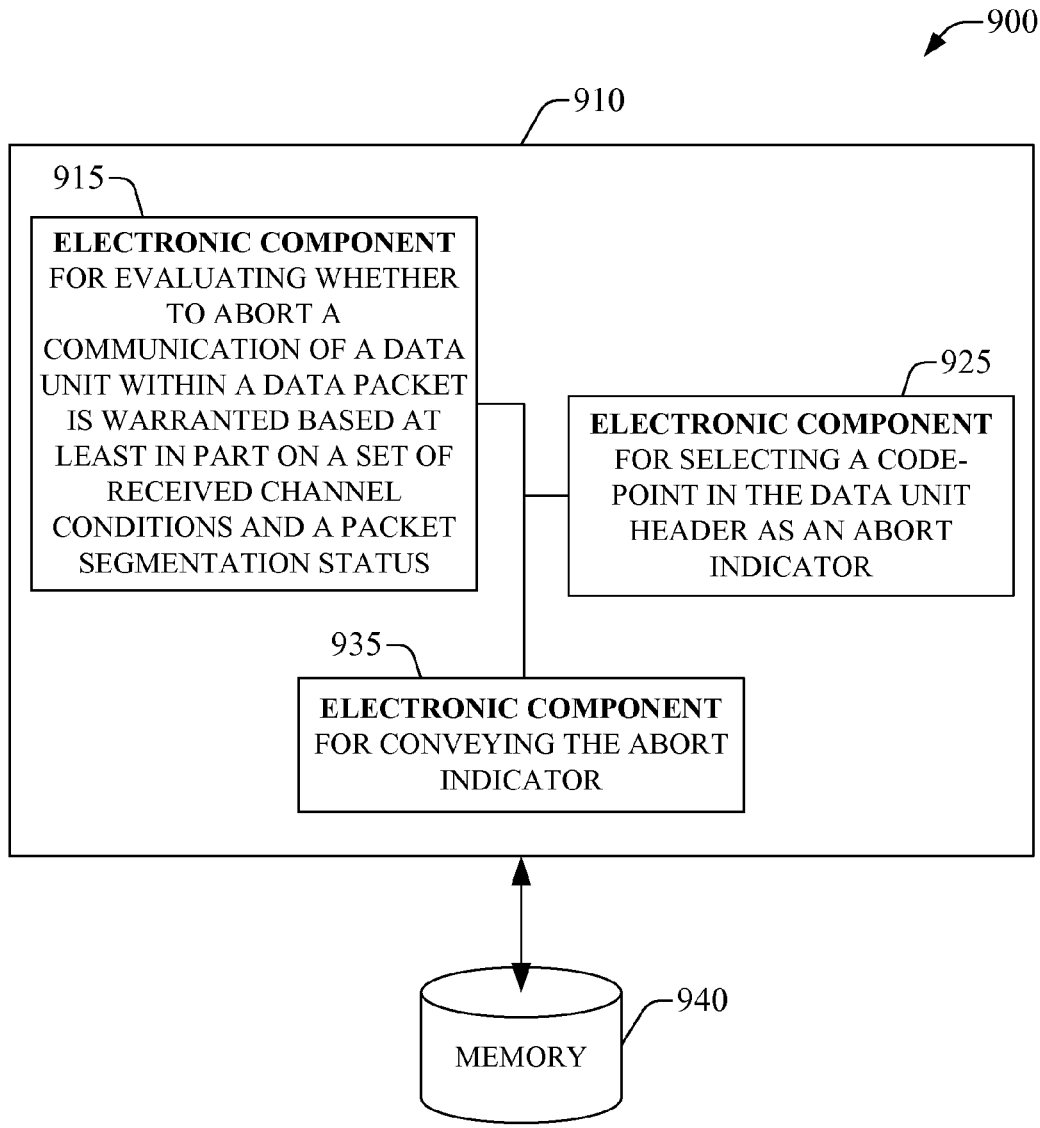
FIG. 9 is a block diagram of an example system that enables a termination of an ongoing communication of a data packet in accordance with aspects described herein.

FIG. 9 is a block diagram of an example system 900 that enables a termination of an ongoing communication of a data packet in accordance with aspects described herein. System 900 can reside, at least partially, within a mobile (e.g., access terminal 240). System 900 includes a logical grouping 910 of electronic components that can act in conjunction. In an aspect of the subject innovation, logical grouping 910 includes an electronic component 915 for evaluating whether to abort a communication of a data unit within a data packet is warranted based at least in part on a set of received wireless channel conditions and a packet segmentation status; an electronic component 925 for selecting a code-point in the data unit header as an abort indicator; and an electronic component 935 for conveying the abort indicator.

System 900 can also include a memory 940 that retains instructions for executing functions associated with electrical components 915, 925, and 935, as well as measured or computed data that may be generated during executing such functions. While shown as being external to memory 940, it is to be understood that one or more of electronic components 915, 925 and 1325, and can exist within memory 940.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range wireless communication techniques.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

As it employed herein, the term "processor" can refer to a classical architecture or a quantum computer. Classical architecture is intended to comprise, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, reserved abort header field combinations, data queues, QoS policies and agreed service parameter for subscriber(s), etc. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method comprising:
    determining to abort an ongoing communication over a wireless channel between a transmitter and a receiver of a data unit in a data packet, wherein the ongoing communication takes place over multiple transmission time intervals;
    inserting an abort code-point in a data unit header of the data unit to be aborted, wherein the abort code-point indicates that the ongoing communication of the data unit in the data packet is to be aborted by the transmitter; and
    transmitting the data packet comprising the data unit header from the transmitter to the receiver.

2. The method of claim 1, wherein inserting an abort code-point in the data unit header further comprises:
    generating a code-point that is a dedicated abort data unit header field that holds a predetermined value which indicates to abort the ongoing communication; and
    transmitting the generated code-point in the data unit header of the data unit to be aborted.

3. The method of claim 1, wherein the data unit in the data packet is one of a medium access control (MAC)-d packet data unit (PDU) within a flow in a plurality of flows with disparate handling priorities.

4. The method of claim 1, wherein the abort data unit header field has a predefined value and is an L-bit word, with L a positive integer.

5. The method of claim 1, wherein inserting an abort code-point in the data unit header comprises:
    establishing a combination of a set of data unit header fields which hold values to indicate the ongoing communication of the data unit in the data packet is to be aborted; and transmitting a data unit header that includes the combination of the set of data unit header fields.

6. The method of claim 5, wherein at least one data unit header field holds a value that is at least one of improper, invalid or non-standard in a communication according to a specification of a wireless technology.

7. The method of claim 5, further comprising retaining a set of combinations of the set of data unit header fields.

8. An electronic device that operates in a wireless environment, the electronic device comprising:
  a processor configured to:
    establish that an ongoing communication over a wireless channel between a transmitter and a receiver of a data unit in a data packet is to be aborted, wherein the ongoing communication takes place over multiple transmission time intervals;
    select a combination of a set of predefined data unit header fields to indicate the ongoing communication of the data unit in the data packet is to be aborted by the transmitter;
    insert the selected combination of the set of predefined data unit header fields in a data unit header of the data unit to be aborted; and
    transmit the combination of the set of predefined data unit header fields to the receiver; and
  a memory coupled to the processor.

9. The electronic device of claim 8, the processor further configured to generate a dedicated abort data unit header field to indicate the communication of the data packet is to be aborted, wherein the abort header field is an L-bit word, with L a positive integer.

10. The electronic device of claim 8, wherein at least one predefined data unit header field in the combination of a set of predefined data unit header fields holds a value that is at least one of improper, invalid or non-standard in a communication according to a specification of a wireless technology.

11. The electronic device of claim 8, wherein at least one predefined data unit header field in the combination of a set of predefined data unit header fields holds a legitimate value with a negligible likelihood to occur.

12. The electronic device of claim 8, wherein the processor configured to establish that an ongoing communication of a data unit in a data packet is to be aborted comprises a processor configured to:
  receive a set of channel conditions; and
  verify the set of channel conditions facilitate a wireless quality of service (QoS) configuration, and establish that the data unit in the data packet is to be aborted when the verification fails.

13. The electronic device of claim 12, wherein the wireless QoS configuration includes at least one of a guaranteed bitrate, a minimum bitrate, an average bitrate, a packet loss rate, or a maximum tolerated latency.

14. The electronic device of claim 8, wherein the set of predefined data unit header fields includes at least two data unit header fields.

15. The electronic device of claim 8, the processor further configured to collect a stream of data and store the stream of data in a set of queues with disparate priorities.

16. The electronic device of claim 8, wherein the data unit in the data packet is one of a medium access control (MAC)-d packet data unit (PDU).

17. The electronic device of claim 8, the memory stores a set of combinations of predefined data unit header fields that indicate a communication of a data unit is to be aborted.

18. An apparatus comprising:
  means for evaluating whether to abort an ongoing communication over a wireless channel between a transmitter and a receiver of a data unit within a data packet is warranted based at least in part on a set of received wireless channel conditions and a packet segmentation status, wherein the ongoing communication takes place over multiple transmission time intervals;
  means for inserting a code-point in a data unit header of the data packet as an abort indicator to indicate that the ongoing communication of the data unit in the data packet is to be aborted by the transmitter; and
  means for conveying the abort indicator to the receiver.

19. The apparatus of claim 18, means for evaluating whether to abort a communication over a wireless channel between a transmitter and a receiver of a data unit within a data packet is warranted further comprising means for verifying the set of wireless channel conditions are compatible with a quality of service configuration.

20. The apparatus of claim 18, means for inserting a code-point in the data unit header as an abort indicator further comprising means for generating a dedicated abort header field.

21. The apparatus of claim 20, means for inserting a code-point in the data unit header as an abort indicator further comprising means for indentifying a combination of a set of data unit header fields, wherein at least one of the data unit header fields in the set adopts an improper value.

22. The apparatus of claim 21, wherein means for inserting an abort indicator further comprising means for identifying a combination of a set of data unit header fields, wherein at least one of the data unit header fields in the set adopts a legitimate yet unlikely value.

23. The apparatus of claim 22, wherein the data unit is a medium access control (MAC)-d packet data unit (PDU).

24. A computer program product including a non-transitory computer-readable medium further comprising:
  code for causing a computer to establish that an ongoing communication over a wireless channel between a transmitter and a receiver of a data unit in a data packet is to be aborted, wherein the ongoing communication takes place over multiple transmission time intervals;
  code for causing a computer to generate a dedicated abort data unit header field with a predefined value to indicate the ongoing communication of the data unit in the data packet is to be aborted by the transmitter, wherein the abort data unit header field is an L-bit word, with L a positive integer;
  code for causing a computer to insert the dedicated abort data unit header field in a data unit header of the data unit to be aborted; and
  code for causing a computer to convey to the receiver the abort data unit header field to signal the ongoing communication of the data unit in the data packet is to be aborted.

25. The computer program product of claim 24, wherein code for causing a computer to establish that an ongoing communication over a wireless channel between a transmitter and a receiver of a data unit in a data packet is to be aborted comprises code for causing the computer to assess whether a set of channel condition sustain a predefined quality of service.

26. The computer program product of claim 25, wherein the data unit is a medium access control (MAC)-d packet data unit (PDU).

27. The computer program product of claim 25, the non-transitory computer-readable medium further comprising:

code for causing a computer to select a combination of a set of existing predefined data unit header fields to indicate the ongoing communication of the data unit in the data packet is to be aborted; and code for causing a computer to convey the combination of the set of predefined data unit header fields.

28. The computer program of claim 27, wherein at least one of the predefined data unit header fields in the set has an invalid value.

29. The computer program of claim 28, wherein at least one of the predefined data unit header fields in the set has a legitimate yet unlikely value.

30. The method of claim 1, wherein determining to abort the ongoing communication includes determining the abort the ongoing communication of the data unit in the data packet based at least in part on at least one of a received wireless channel state information (CSI), or an agreed quality of service (QoS).

31. The method of claim 30, wherein an agreed QoS includes at least one of a guaranteed bitrate, a minimum bitrate, an average bitrate, a packet loss rate, or a maximum tolerated latency.

32. The method of claim 1, wherein inserting an abort code-point in a data unit header of the data unit to be aborted comprises:

inserting an abort code-point in at least one of a size indicator (SID) field, an 'N' field or an 'F' field of the data unit header of the data unit to be aborted.

33. The electronic device of claim 8, wherein at least one predefined data unit header field in the combination of a set of predefined data unit header fields is selected from the group of header fields consisting of a size indicator (SID) field, an 'N' field and an 'F' field.

34. The apparatus of claim 18, further comprising means for inserting the abort code-point in at least one of a size indicator (SID) field, an 'N' field or an 'F' field of the data unit header of the data packet.

35. The computer program product of claim 24, wherein the code for causing a computer to generate a dedicated abort data unit header field comprise code for causing a computer to generate a dedicated abort data unit header field based on at least one of a size indicator (SID) field, an 'N' field or an 'F' field.

* * * * *